United States Patent
Takeuchi et al.

(10) Patent No.: US 10,763,491 B2
(45) Date of Patent: Sep. 1, 2020

(54) LOW-TEMPERATURE SYNTHESIS PROCESS OF MAKING MGZMXOY, WHERE M IS MN, V OR FE, FOR MANUFACTURE OF ELECTRODE MATERIALS FOR GROUP II CATION-BASED BATTERIES

(71) Applicant: The Research Foundation for the State University of New York, Albany, NY (US)

(72) Inventors: Kenneth Takeuchi, South Setauket, NY (US); Esther Takeuchi, South Setauket, NY (US); Amy Marschilok, Setauket, NY (US)

(73) Assignee: The Research Foundation for the State University of New York, Albany, NY (US)

( * ) Notice: Subject to any disclaimer, the term of this patent is extended or adjusted under 35 U.S.C. 154(b) by 130 days.

(21) Appl. No.: 15/301,307

(22) PCT Filed: Mar. 30, 2015

(86) PCT No.: PCT/US2015/023388
§ 371 (c)(1),
(2) Date: Sep. 30, 2016

(87) PCT Pub. No.: WO2015/153485
PCT Pub. Date: Oct. 8, 2015

(65) Prior Publication Data
US 2018/0205068 A1 Jul. 19, 2018

Related U.S. Application Data

(60) Provisional application No. 61/973,495, filed on Apr. 1, 2014.

(51) Int. Cl.

| | |
|---|---|
| *H01M 4/00* | (2006.01) |
| *H01M 4/04* | (2006.01) |
| *H01M 4/50* | (2010.01) |
| *H01M 4/52* | (2010.01) |
| *H01M 10/054* | (2010.01) |
| *C01G 31/00* | (2006.01) |
| *C01G 45/12* | (2006.01) |
| *H01M 4/48* | (2010.01) |
| *H01M 4/58* | (2010.01) |
| *H01M 10/052* | (2010.01) |
| *C01G 49/00* | (2006.01) |
| *H01M 10/0525* | (2010.01) |
| *H01M 4/02* | (2006.01) |

(52) U.S. Cl.
CPC ............ *H01M 4/049* (2013.01); *C01G 31/00* (2013.01); *C01G 45/1221* (2013.01); *C01G 49/0036* (2013.01); *H01M 4/48* (2013.01); *H01M 4/50* (2013.01); *H01M 4/52* (2013.01); *H01M 4/5825* (2013.01); *H01M 10/052* (2013.01); *H01M 10/054* (2013.01); *C01P 2002/72* (2013.01); *C01P 2004/03* (2013.01); *C01P 2006/12* (2013.01); *C01P 2006/40* (2013.01); *H01M 10/0525* (2013.01); *H01M 2004/027* (2013.01)

(58) Field of Classification Search
CPC ........ H01M 4/00; H01M 4/48; C01G 31/006; C01G 45/006; C01G 49/009
See application file for complete search history.

(56) References Cited

U.S. PATENT DOCUMENTS

2012/0164537 A1  6/2012 Aoyagi et al.
2013/0260255 A1  10/2013 Doe et al.

FOREIGN PATENT DOCUMENTS

| JP | 2002025555 | 1/2002 |
|---|---|---|
| JP | 2007-088215 | * 4/2007 |
| WO | 2002/030824 | 4/2002 |

OTHER PUBLICATIONS

Sun, "Study of . . . Batteries" Asian J. Chem. 23, No. 3(2011), pp. 1399-1400. (Year: 2011).*
Lee et al, "Synthesis and characterization of sodium vanadium . . . . " Phys. Chem. Chem. Phys., 2011, 13, 18047-54. (Year: 2011).*
Partial translation of JP2007-088215, Apr. 2007. (Year: 2007).*
Yuan, H, et al., "Development of Magnesium-Insertion Positive Electrode for Rechargeable Magnesium Batteries," J Mater. Sci. Technol., vol. 20 No. 1, 2004.
Lee, SH et al., "Sol Gel Based Synthesis and Electrochemistry of Magnesium Vanadium Oxide: A Promising Cathode Material for Secondary Magnesium Ion Batteries," ECS Electrochemistry Letters, 3 (8) A87-A90 (2014).
Written Opinion of the International Searching Authority established Jun. 6, 2015 by the USPTO/ISA and dated Jul. 7, 2015—PCT/US2015/023388.
Cromer, CE, "Preparation and Characterization of Vanadium Oxides on Carbon Fiber Paper as Electrodes for Pseudocapacitors," Masters Thesis, Georgia Institute of Technology, cover pages and pp. 7-17, May 2013.

* cited by examiner

*Primary Examiner* — Steven J Bos
(74) *Attorney, Agent, or Firm* — Sack IP Law p.c.; Alan M. Sack, Esq.

(57) ABSTRACT

Preparation, characterization, and an electrochemical study of $Mg_{0.1}V_2O_5$ prepared by a novel sol-gel method with no high-temperature post-processing are disclosed. Cyclic voltammetry showed the material to be quasi-reversible, with improved kinetics in an acetonitrile-, relative to a carbonate-, based electrolyte. Galvanostatic test data under a C/10 discharge showed a delivered capacity >250 mAh/g over several cycles. Based on these results, a magnesium anode battery, as disclosed, would yield an average operating voltage ~3.2 Volts with an energy density ~800 mWh/g for the cathode material, making the newly synthesized material a viable cathode material for secondary magnesium batteries.

9 Claims, 10 Drawing Sheets

LOW-TEMPERATURE SYNTHESIS PROCESS OF MAKING MGZMXOY, WHERE M IS MN, V OR FE, FOR MANUFACTURE OF ELECTRODE MATERIALS FOR GROUP II CATION-BASED BATTERIES

CROSS-REFERENCE TO OTHER APPLICATIONS

This application claims priority to U.S. Provisional Patent Application No. 61/973,495, filed 1 Apr. 2014, which is incorporated by reference in its entirety.

STATEMENT OF GOVERNMENT RIGHTS

The present invention was made with government support under Purchase Orders #1111356 and #1275961 administered through Sandia National Laboratories for the Department of Energy, Office of Electricity. The United States government has certain rights in the invention.

BACKGROUND

Magnesium batteries remain promising as possible replacements for lithium-ion batteries, with critical advantages of low cost and high earth-abundance of magnesium. Beyond economic and environmental reasons, magnesium is also desirous as an anode material because non-dendritic electrochemical behavior can be observed and magnesium offers a large theoretical volumetric capacity of 3832 mAh/cm$^3$ (J. Muldoon, et al., "Electrolyte roadblocks to a magnesium rechargeable battery," *Energy & Environmental Science*, 5, 5941 (2012) and T. D. Gregory, et al., "Nonaqueous Electrochemistry of Magnesium: Applications to Energy Storage," *Journal of The Electrochemical Society*, 137, 775 (1990), each of which is incorporated by reference in its entirety). Thus the research and optimization associated with magnesium batteries have been a focus of research recently (D. Aurbach, et al., "Progress in Rechargeable Magnesium Battery Technology," *Advanced Materials*, 19, 4260 (2007); H. D. Yoo, et al., "Mg rechargeable batteries: an on-going challenge," *Energy & Environmental Science*, 6, 2265 (2013); E. Levi, et al., "On the Way to Rechargeable Mg Batteries: The Challenge of New Cathode Materials," *Chemistry of Materials*, 22, 860 (2009); and P. Novák, et al., "Magnesium insertion electrodes for rechargeable nonaqueous batteries—a competitive alternative to lithium?," *Electrochimica Acta*, 45, 351 (1999), each of which is incorporated by reference in its entirety). Notably, there are still challenges that must be overcome to make application of magnesium battery technology widespread.

A fundamental challenge associated with magnesium cathodes is the $Mg^{2+}$ intercalation into host materials. The strong polarization of the small divalent $Mg^{2+}$ requires shielding or some other approach to reduce the impact on the inherently slow ion diffusion (Muldoon, 2012). In this aspect, some success was encountered with the development of Chevrel phase materials, which exhibit relatively fast Mg-ion diffusion and high capacity, although at a voltage that is lower than ideal (Aurbach, 2007 and Yoo, 2013).

Alternatively, $MoS_2$ has been a potentially viable cathode, with density functional theory (DFT) calculations predicting a maximum theoretical capacity of 223 mAh/g (S. Yang, et al., "First-principles study of zigzag $MoS_2$ nanoribbon as a promising cathode material for rechargeable Mg batteries," *The Journal of Physical Chemistry C*, 116, 1307 (2011), which is incorporated by reference in its entirety), and experimental reports demonstrating a discharge capacity of 119 mAh/g (Y. Liu, et al., "Sandwich-structured graphene-like $MoS_2$/C microspheres for rechargeable Mg batteries," *Journal of Materials Chemistry A*, 1, 5822 (2013), which is incorporated by reference in its entirety).

In addition, manganese oxides including $\alpha$-$MnO_2$, birnessite-$MnO_2$, and hollandite-$MnO_2$ have recently been tested, where birnessite-$MnO_2$ materials realized capacities of 109 mAh/g, while hollandite-$MnO_2$ cathodes showed discharge capacities as high as 475 mAh/g (Yoo, 2013; S. Rasul, et al., "High capacity positive electrodes for secondary Mg-ion batteries," *Electrochimica Acta*, 82, 243 (2012); and R. Zhang, et al., "$\alpha$-$MnO_2$ as a cathode material for rechargeable Mg batteries," *Electrochemistry Communications*, 23, 110 (2012), each of which is incorporated by reference in its entirety).

Vanadium-based oxides are appealing due to the ready availability of multiple valence states ($V^{5+} \rightarrow V^{3+}$), offering the potential for high energy density due to multiple electrons transferred per formula unit (C. J. Patridge, et al., "Synthesis, Spectroscopic Characterization, and Observation of Massive Metal-Insulator Transitions in Nanowires of a Nonstoichiometric Vanadium Oxide Bronze," *Nano Letters*, 10, 2448 (2010), which is incorporated by reference in its entirety, and A. S. Tracey, et al., *Vanadium: Chemistry, Biochemistry, Pharmacology, and Practical Applications*, particularly at Chapter 13, pp. 221-239, CRC Press, Florida (2007), which is incorporated by reference).

Previous electrochemical studies of vanadium oxide, $V_2O_5$, as a cathode material in magnesium-based electrolytes have shown that capacities of ~170 mAh/g could be achieved, where the capacity was found to improve with water added to the electrolyte (L. Yu and X. Zhang, "Electrochemical insertion of magnesium ions into $V_2O_5$ from aprotic electrolytes with varied water content," *J. Colloid Interface Sci.*, 278, 160 (2004); P. Novak and J. Desilvestro, "Electrochemical Insertion of Magnesium in Metal Oxides and Sulfides from Aprotic Electrolytes," *J. Electrochem. Soc.*, 140, 140 (1993); P. Novak, et al., "Magnesium Insertion in Vanadium Oxides: A Structural Study," *Z. Phys. Chem. (Munich)*, 185, 51 (1994); and P. Novak, et al., "Electrochemical Insertion of Magnesium into Hydrated Vanadium Bronzes," *J. Electrochem. Soc.*, 142, 2544 (1995), each of which is incorporated by reference in its entirety). In other studies the effects of vanadium oxide morphology on the electrochemistry was explored. For example, a reversible insertion of magnesium was observed with vanadium oxide nanotubes, with reported capacities of 120 mAh/g (L. Jiao, et al., "Electrochemical insertion of magnesium in open-ended vanadium oxide nanotubes," *J. Power Sources*, 156, 673 (2006); L. Jiao, et al., "Mg intercalation properties into open-ended vanadium oxide nanotubes," *Electrochem. Commun.*, 7, 431 (2005); and L.-F. Jiao, et al., "Synthesis of $Cu_{0.1}$-doped vanadium oxide nanotubes and their application as cathode materials for rechargeable magnesium batteries," *Electrochem. Commun.*, 8, 1041 (2006), each of which is incorporated by reference in its entirety). Thin film vanadium oxide prepared via high temperature thermal vacuum deposition has been found to deliver 150-180 mAh/g (G. Gershinsky, et al., "Electrochemical and Spectroscopic Analysis of $Mg^{2+}$ Intercalation into Thin Film Electrodes of Layered Oxides: $V_2O_5$ and $MoO_3$," *Langmuir*, 29, 10964 (2013), which is incorporated by reference in its entirety).

In general, sol-gel synthetic strategies for materials preparation can lead to scale up and commercialization and thus are appropriate for the preparation of materials with possible industrial applications. An early report on the insertion of polyvalent ions used vanadium oxide aerogels prepared by ion exchange of sodium metavanadate (D. B. Le, et al., "Intercalation of Polyvalent Cations into $V_2O_5$ Aerogels," Chemistry of Materials, 10, 682 (1998), which is incorporated by reference in its entirety). Insertion of $Mg^{2+}$ into $V_2O_5$ aerogel experimentally showed that the gel prepared materials can be effective hosts for polyvalent and well as monovalent cations.

A later report of sol-gel based preparations of $V_2O_5$ used hydrogen peroxide and metallic vanadium powder as precursors (D. Imamura, et al., "Mg Intercalation Properties into $V_2O_5$ gel/Carbon Composites under High-Rate Condition," J. Electrochem. Soc., 150, A753 (2003), which is incorporated by reference in its entirety). Thin coatings on indium-tin oxide glass were prepared and showed reversible peaks by voltammetry and sustained currents as high as 20 A/g. A sol-gel preparation of $MgV_2O_6$ from $Mg(CH_3COO)_2$, citric acid, and $NH_4VO_3$ was reported followed by extensive thermal treatment at 350° C. and 600° C. (J.-Z. Sun, "Preparation and Characterization of Cathode Material for Magnesium Cells," Asian J. Chem., 23, 1397 (2011), which is incorporated by reference in its entirety). An initial delivered capacity of 120 mAh/g with 40 mAh/g delivered after 10 cycles was observed.

While prior cathode materials have advanced significantly in recent years, there remain challenges in the synthesis and utilization of suitable electrode materials for Group II cation-based batteries.

SUMMARY

In the following description it is to be understood that the term "compound" is one of convenience and should not be interpreted to mean a line compound having only a single composition, but rather a composition of matter having some variation in the relative amounts of each major constituent. These compounds need not be stoichiometric, and may be enriched or deficient in one or more major constituents. It is to be further understood that the compounds referred to may contain minute quantities of impurities. The compounds may be simple or hydrated.

The preparation of magnesium-deficient transition metal oxide, $Mg_zM_xO_y$, where M is V, Mn, or Fe, by a new synthetic strategy is disclosed. The novel synthesis is a low-temperature direct method involving no intermediates between the precursor materials and the final composition, and not requiring imposition of physical constraints on the materials during processing.

In some embodiments, the composition comprises a compound having the formula $Mg_zM_xO_y$, with M=V, Mn, or Fe. Here each of x, y, and z is greater than zero, and $z/(x+y+z)$ is the mole fraction of Mg in the compound, $x/(x+y+z)$ is the mole fraction of metal M in the compound, and $y/(x+y+z)$ is the mole fraction of O in the compound. In some embodiments the compound is hydrated. In some embodiments the composition has the formula $Mg_{0.1}V_2O_5 \cdot 1.8H_2O$.

In some embodiments a novel process for preparing Mg-deficient transition metal oxides is described. A direct, low-temperature synthesis may be carried out at temperatures below 60° C., proceeding directly from precursor to final composition without secondary processing or constraining media. In some embodiments the synthesis is a sol-gel synthesis. In some cases the synthesis may be followed by a high-temperature annealing step.

In some embodiments a novel electrode material is described, using as the active material a composition having a formula $Mg_zM_xO_y$, with M=V, Mn, or Fe. Here each of x, y, and z is greater than zero, and $z/(x+y+z)$ is the mole fraction of Mg in the compound, $x/(x+y+z)$ is the mole fraction of metal M in the compound, and $y/(x+y+z)$ is the mole fraction of O in the composition. In some embodiments the compound is hydrated. In some embodiments the composition has the formula $Mg_{0.1}V_2O_5 \cdot 1.8H_2O$.

In some embodiments the novel electrode material is incorporated into a cathode that exhibits reversibility in response to a cycled applied voltage when immersed in an electrolyte containing $Mg^{2+}$ ions.

In some embodiments the invention encompasses a novel secondary (rechargeable) battery system designed to operate with an electrolyte containing $Mg^{2+}$ ions, $Li^{1+}$ ions, or both.

This, being a summary, is necessarily brief and does not put forth all of the features and advantages of the novel composition, its method of making, or its use in electrode materials and battery systems. The invention may be more fully understood with reference to the drawings and the detailed description that follow.

BRIEF DESCRIPTION OF THE DRAWINGS

FIGS. 8A and 8B are graphs that show the results of a galvanostatic cycle test at C/10 of $Mg_{0.1}V_2O_5$ in 0.5 M $Mg(ClO_4)_2$ $CH_3CN$ electrolyte versus $Ag/Ag^+$. FIG. 8A shows a plot of voltage versus capacity for cycles number 1, 2, and 5, while FIG. 8B charts the capacity versus cycle number for cycles 1-7.

DETAILED DESCRIPTION

Disclosed is a new battery system that uses naturally abundant, low cost materials with minimal environmental impact. The disclosed batteries are based on alternative technologies to lithium ion batteries which are currently in widespread use. The composition of the battery materials becomes increasingly significant as the power source installations increase in size. The energy density of the final battery is somewhat lower than lithium ion batteries, but is higher than lead acid batteries. However, the new battery technology will have significantly lower environmental impact than the lead-based systems.

Lithium ion batteries and lead acid batteries are used as benchmark systems. Variation in the cost of specific batteries is dependent on many factors including design, manufacturing process, and the number of units manufactured. The cost comparisons prepared here take into account the cost of the metals that form the basis of the battery system materials. Comparisons among lithium, lead, and magnesium metals and anodes formed from those metals are provided in Tables 1 and 2. Several comparisons provide insight into the projected impact of this invention. The cost of magnesium per pound is 25 times lower than that of lithium metal and approximately equal to that of lead. However, the metal's cost needs to be considered in light of its electrochemical value. The cost per 1000 Ah is dramatically different where magnesium is 12 and 14 times lower than lead and lithium, respectively. When this is translated to $/Wh, there is a 12 and 23 times lower cost for magnesium. Thus, use of a magnesium-based system paves the way toward more than an order of magnitude cost reduction when compared to lead- and lithium-based systems.

Comparisons of energy density in Wh/kg are also important to consider. The energy density comparisons are based on an anode-focused analysis. The cathode energy density for magnesium-based batteries is likely to be similar to lithium ion systems based on metal oxides and higher than lead, thus, the relative comparisons here are reasonable. Lithium metal provides high energy density; however, lithium ion batteries do not currently use lithium metal anodes and have an energy density 10-fold less. Thus, the anode energy density of lithium ion, lead, and magnesium are 1390, 570 and 4850, respectively. Therefore, the energy density of the magnesium-based batteries proves to be 3.4× higher than lithium ion and 8.5× higher than lead batteries.

Through our initial research we identified materials suitable for use in a new battery system using naturally abundant, low cost materials with minimal environmental impact. Anode materials may include Mg metal, materials alloying with Mg, or other Mg-containing materials. Cathode materials, which are the subject of this disclosure, are based on metal oxides $Mg_zM_xO_y$, (M=Fe, Mn, V), where rates of magnesium ion ($Mg^{2+}$) transport are facilitated by small crystallite size and tuning the crystallographic structure and bonding character within the ion channels. We have demonstrated the ability to control composition, crystallite size and interior water content of several metal oxide systems by direct low-temperature syntheses without secondary processing or constraining media. Further, we have demonstrated significant favorable crystallite size and water content effects on capacity and capacity retention during cycling in lithium based cells. Similar favorable impact in magnesium-based cells is also achieved.

Successful utilization of the disclosed synthesis of new electrode materials will lead to a new class of secondary batteries based on magnesium ions. The criteria for the composition of materials selected are based on high natural earth abundance, low environmental impact, and opportunity for low cost. These considerations become increasingly significant as the power source installations increase in size. Magnesium is ~1000 times more abundant than lithium and is air stable, both beneficial criteria for large power systems. Magnesium would have much lower environmental impact than lead-, nickel-, or cadmium-based batteries.

The disclosed invention provides for the development of a new battery system using naturally abundant, low-cost materials with minimal environmental impact. The cost of magnesium is ~$1.11/lb compared to $28.24/lb for lithium, providing an opportunity for substantial cost savings. A crystalline $MgV_2O_6$ precursor was used to demonstrate feasibility; however, this precursor was treated by ion exchange to form a magnesium vanadium oxide gel, with variable Mg/V ratios being possible in the target product. This synthetic approach avoided the need for extensive high temperature post synthesis treatment. The magnesium content was controlled and, in this case, maintained as x=0.1 in $Mg_xV_2O_5$, yielding a layered material. This low temperature sol-gel-derived magnesium vanadium oxide was then evaluated as a possible cathode material in magnesium ion-based electrolytes, where both solvent and salt variations of the electrolytes were explored. This work demonstrates the utility of a low-temperature, aqueous-based synthesis of a $Mg_xV_2O_5$ material and the promise of $Mg_xV_2O_5$ materials as cathode materials in magnesium ion battery systems.

A novel low-temperature preparation of a sol-gel-based magnesium vanadium oxide material, $Mg_xV_2O_5$, is disclosed. X-ray diffraction showed 00/turbostratic ordering, with an interlayer spacing of 12.3 Å. Inductively-coupled plasma optical emission spectroscopy and thermogravimetric analysis are consistent with the composition of $Mg_{0.1}V_2O_5 \cdot 1.8H_2O$. Cyclic voltammetry demonstrated quasi-reversible behavior, with improved current per gram for an acetonitrile-based electrolyte relative to carbonate-based electrolyte. Cycle type testing was conducted at a C/10 rate where the material displayed a sloping discharge curve, delivering ~250 mAh/g over multiple discharge-charge cycles consistent with the insertion of one equivalent of $Mg^{2+}$ (two electron equivalents) per formula unit.

Translating these results to a magnesium anode battery based on standard potentials in aqueous solution (G. G. Perrault in Chapter 22 "Beryllium, Magnesium, Calcium, Strontium, Barium, and Radium," of A. J. Bard, et al., *Standard Potentials in Aqueous Solution*, New York: Marcel Dekker Inc., 1985, pp. 687-699, International Union of Pure and Applied Chemistry, CRC Press New York (1985), which is incorporated by reference) would yield an average operating voltage of approximately 3.2 Volts with an energy density of approximately 800 mWh/g for the cathode material. Consistent interlayer spacing was observed upon $Mg^{2+}$ insertion and removal, demonstrating promise for improved cathode material stability over multiple long-term discharge-charge cycling. Thus, the electrochemistry of the sol-gel prepared $Mg_{0.1}V_2O_5 \cdot 1.8H_2O$ material demonstrates that $Mg_xV_2O_5$ materials prepared by low-temperature sol-gel methods are useful cathode materials for magnesium-based batteries.

Cathode Examples.

Manganese (Mn), vanadium (V), and iron (Fe) have been selected to form the basis of the material framework structures for the proposed oxides ($Mg_zM_xO_y$). Manganese (Mn) is advantageous due to its environmental sustainability and low cost. Structural diversity is another advantage, where manganese oxides can be tuned to dimensions suited for ion transport. Vanadium (V) offers the greatest synthetic diversity, allowing for many different types of layered structures. Iron oxides provide the advantage of low cost and earth abundance. While the Fe(III)/Fe(II) couple would be expected to have lower potential than the vanadium(V) compound, the Fe(III)/Fe(IV) couple would be expected to have higher voltage if accessible.

Figure 1:
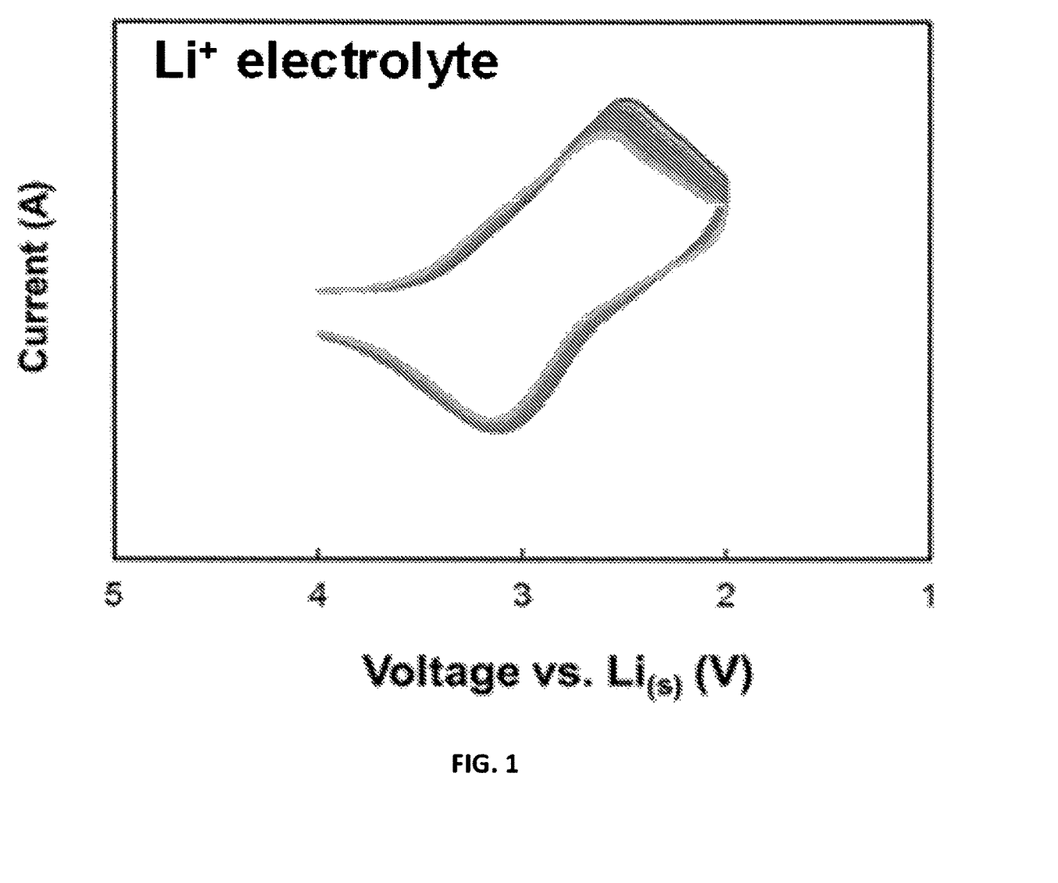
FIG. 1 is a cyclic voltammogram showing the current at the $Mg_zV_xO_y$ electrode as a function of applied voltage in a lithium ion-based electrolyte.
Figure 2:
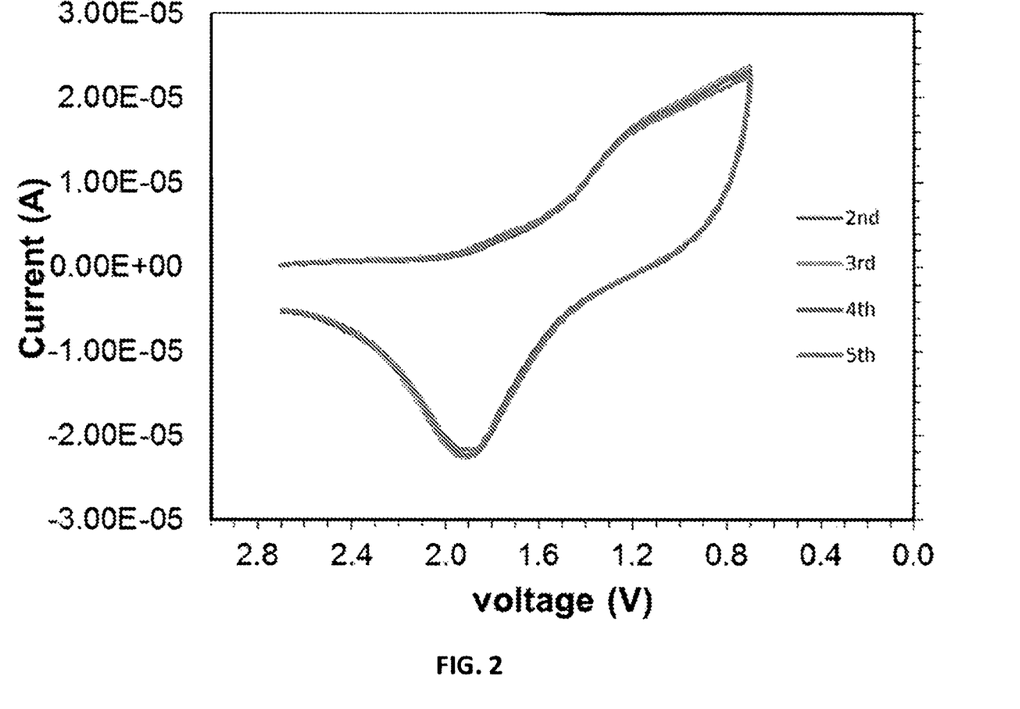
FIG. 2 is a cyclic voltammogram showing the current at the $Mg_zV_xO_y$ electrode as a function of applied voltage in a magnesium ion-based electrolyte.
Figure 3:
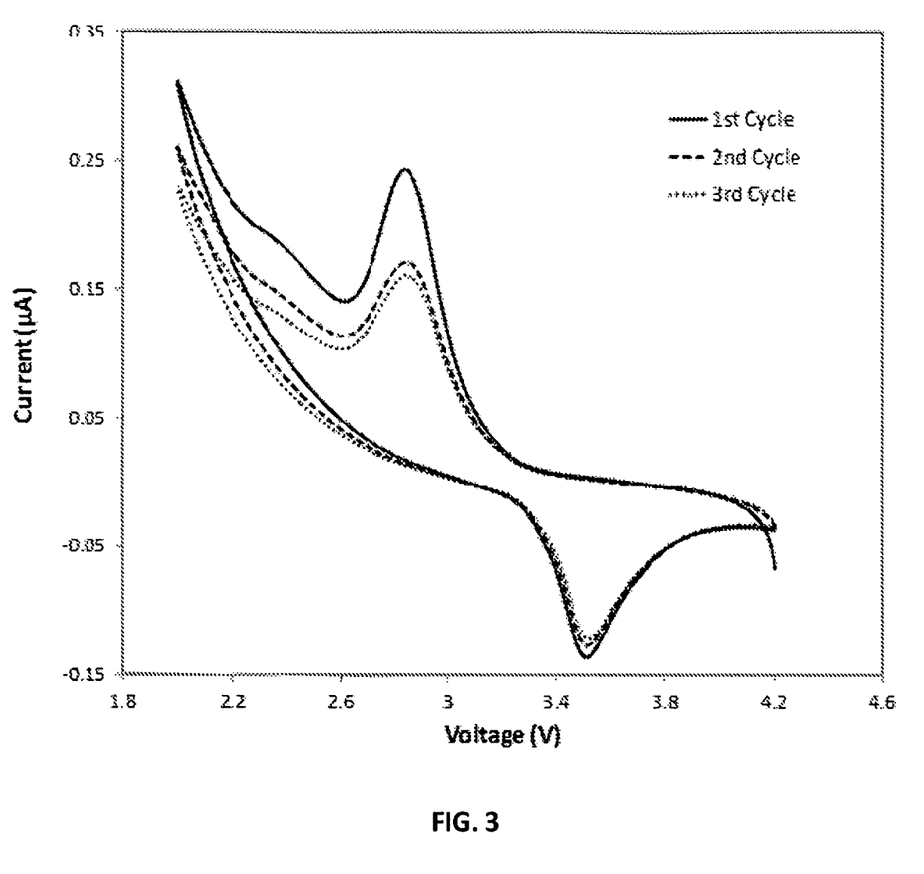
FIG. 3 is a cyclic voltammogram showing the current at the $Mg_zMn_xO_y$ electrode as a function of applied voltage in a lithium ion-based electrolyte.
Figure 4:
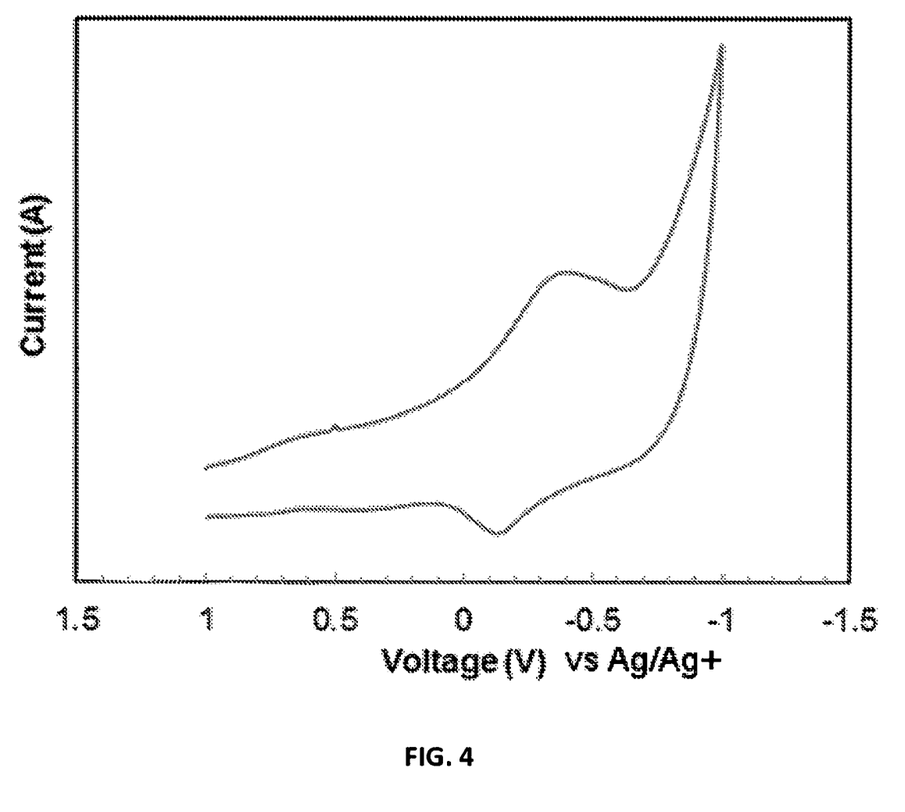
FIG. 4 is a cyclic voltammogram showing the current at the $Mg_zMn_xO_y$ electrode as a function of applied voltage in a magnesium ion-based electrolyte.

Specific examples for $Mg_zMn_xO_y$ and $Mg_zV_xO_y$ are disclosed. FIG. 1 shows the voltammetry of $Mg_zV_xO_y$ in lithium ion-containing electrolyte. FIG. 2 shows voltammetry of $Mg_zV_xO_y$ in magnesium ion-containing electrolyte. FIG. 3 illustrates an example of the voltammetry of $Mg_zMn_xO_y$ in lithium ion-based electrolyte. FIG. 4 shows the voltammetry of $Mg_zMn_xO_y$ in magnesium-based electrolyte. Notably, the cathodes show reversibility in the magnesium-based electrolyte, illustrating their suitability for use in a magnesium ion battery system. Thus, electrochemically relevant reversibility of the materials is demonstrated in $Mg^{2+}$ ion-containing electrolytes. This initial data demonstrates the utility of these materials for use in magnesium-based batteries. The Fe(III)/Fe(II) couple in iron oxides would have lower potential than the vanadium(V) compound; however, if accessible, the Fe(III)/Fe(IV) couple would be expected to have higher voltage.

The synthesis of the active materials, $Mg_zMn_xO_y$ and $Mg_zV_xO_y$, can be accomplished by various means including coprecipitation, ion exchange, sol-gel synthesis, high temperature reactions, and hydrothermal synthesis. High temperature reaction conditions as described here are those >300° C. Low temperature conditions are those that are below the reflux point of water. In this case, the sol-gel reaction is conducted at ambient (room) temperature. Iron-based materials may be prepared by coprecipitation methods. Fe(II) salts that are soluble, such as iron sulfate and iron nitrate, may be used as starting materials for the reaction. The coprecipitation reactions may be carried out at ambient temperature.

TABLE 1

Properties of battery anode materials

| Metal | Atomic weight (g/mol) | Electron equivalents/ formula unit | Specific capacity (Ah/kg) | Average voltage (Volts) | Specific energy (Wh/kg) |
|---|---|---|---|---|---|
| Lithium | 6.94 | 1 | 3,862 | 3.6 | 1,390 |
| Lead | 207 | 2 | 259 | 2.2 | 570 |
| Magnesium | 24.3 | 2 | 2,205 | 2.2 | 4,850 |

TABLE 2

Cost analysis of battery anode materials

| Metal | Cost per mass unit ($/kg) | Cost per capacity unit ($/1000 Ah) | Cost per energy unit ($/1000 Wh) |
|---|---|---|---|
| Lithium | $62.20 | $16.11 | $57.98 |
| Lead | $ 3.70 | $14.29 | $31.44 |
| Magnesium | $ 2.46 | $ 1.11 | $ 2.45 |

Experimental Protocol

Magnesium vanadium oxide ($Mg_xV_2O_5$) was synthesized via a novel sol-gel based process, inspired by the sol-gel preparation of sodium vanadium oxide ($Na_xV_2O_5$) (C.-Y. Lee, et al., "Synthesis and characterization of sodium vanadium oxide gels: the effects of water (n) and sodium (x) content on the electrochemistry of $Na_xV_2O_5.nH_2O$," Physical Chemistry Chemical Physics, 13, 18047 (2011), which is incorporated by reference in its entirety). First, magnesium vanadate ($MgV_2O_6$) was prepared and isolated as a crystalline material, as described previously (Sun, 2011). The crystalline material was dissolved in water at ambient temperature (20° C. to 25° C.) or up to 60° C. with stirring, and then treated by ion exchange to form the magnesium-deficient $Mg_xV_2O_5$ sol. When an ion exchange resin was used, the solution interaction with the ion exchange resin was carried out in two ways; each was effective. The resin was formed into a column and the solution was passed through the column. Alternatively, the ion exchange resin was added to the solution and gently swirled for several minutes followed by filtration to remove the resin. After gelation at room temperature, the material was recovered and characterized by x-ray powder diffraction (XRD) using a Rigaku SmartLab XRD (sold by Rigaku Americas Corporation, 9009 New Trails Dr., The Woodlands, Tex. 77381-5209), with Cu $K_\alpha$ radiation and Bragg-Brentano focusing geometry. The gelation time could be varied from 6 hours to 1 week, but was typically 1 to 3 days. Elemental composition was determined via inductively coupled plasma-optical emission spectrometry (ICP-OES) with a Thermo Scientific ICAP ICP-OES (sold by Thermo Fisher Scientific Inc., 81 Wyman Street, Waltham, Mass. 02451). Scanning electron microscopy (SEM) was performed using a Hitachi 4800 operating at 10 kV. Simultaneous thermogravimetric analysis/differential scanning calorimetry (TGA/DSC) was performed using a TA Instruments Q600 (sold by TA Instruments, 159 Lukens Drive, New Castle, Del. 19720). Brunauer-Emmett-Teller surface area was measured by nitrogen adsorption, with a Quantachrome Nova e Series instrument (sold by Quantachrome Instruments, 1900 Corporate Dr, Boynton Beach, Fla. 33426.)

Electrochemical testing was conducted at room temperature between 20° C. and 27° C. A three-electrode assembly was used, with silver/silver ion ($Ag/Ag^+$) reference and platinum auxiliary electrodes. For the electrolyte, 0.1 M or 0.5 M magnesium perchlorate ($Mg(ClO_4)_2$) or magnesium bis(trifluoromethylsulfonylimide) ($Mg(TFSI)_2$) was used, in either acetonitrile ($CH_3CN$) or 30:70 ethylene carbonate: dimethyl carbonate (EC:DMC) solvent. Each combination of salt and solvent was tested. Cyclic voltammetry data was collected between voltage limits of −1.0 Volt and +1.2 Volts using a scan rate of 0.1 mV/s. Galvanostatic data used a C/10 rate for both discharge and charge, between voltage limits of −1.0 Volt and +1.0 Volt. A 1C rate is defined as the full capacity discharging in 1 hour (1C). A C/2 rate would be full capacity discharging over the course of 2 hours and a 2C rate would be full discharge in ½ hour.

Material Characterization

Vanadium oxide xerogels ($V_2O_5.nH_2O$) are comprised of vanadium oxygen layers formed from square pyramidal $VO_5$ polyhedra, with water molecules present in the interlayer positions. In addition to water, a variety of metal ions can be positioned within the interlayer positions through ion exchange. Incorporation of sodium ions into layered vanadium oxides by introducing a $Na^+$ source such as sodium hydroxide, sodium nitrate, sodium sulfate, or sodium chloride to a vanadate gel precursor has been previously described (M. Millet, et al., "A new hydrated sodium vanadium bronze as Li insertion compound," Solid State Ionics, 112, 319 (1998); E. M. Sabbar, et al., "Synthetic Pathways to New Hydrated Sodium and Lithium Vanadium Bronzes," Journal of Solid State Chemistry, 149, 443 (2000); L. Znaidi, et al., "Kinetics of the $H^+/M^+$ ion exchange in $V_2O_5$ xerogel," Solid State Ionics, 28-30, 1750 (1988); and O. Durupthy, et al., "Influence of pH and ionic strength on vanadium(V) oxides formation. From $V_2O_5.nH_2O$ gels to crystalline $NaV_3O_8.1.5H_2O$," Journal of Materials Chemistry, 15, 1090 (2005), each of which is incorporated by reference in its entirety).

We developed a streamlined synthetic approach allowing for direct incorporation of sodium during the gel formation step (Lee, 2011). In this methodology, a divalent cation ($Mg^{2+}$) is incorporated via sol-gel methodology, resulting in the direct synthesis of a new magnesium vanadium oxide material, $Mg_zV_2O_5$. Both the preparation and resulting material are new. Incorporation of divalent cations can be more difficult than that of monovalent cations due to their lower solubility and lower mobility in the solid state, requiring adaptation of the synthesis method to the alternate metal types used here.

Figure 5:
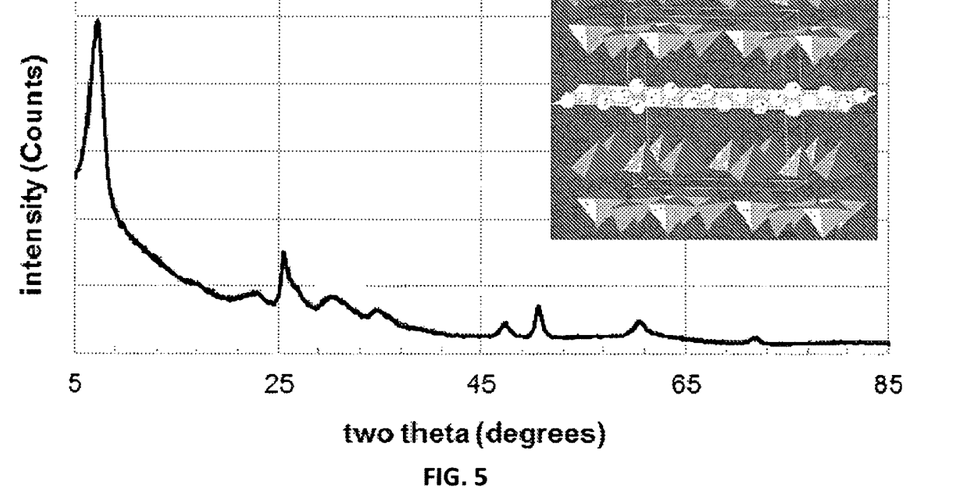
FIG. 5 is an X-ray powder diffraction (XRD) pattern of $Mg_{0.1}V_2O_5$ with the inset providing a schematic of the $Mg_xV_2O_5$ structure.

X-ray powder diffraction (XRD) data was collected on the as-prepared material (FIG. 5). This data showed pronounced 001 reflections consistent with lamellar turbostratic ordering, not seen before in $Mg_zV_2O_5$-type compounds, (cf. V. Petkov, et al., "Structure of $V_2O_5.nH_2O$ Xerogel Solved by the Atomic Pair Distribution Function Technique," *J Am Chem Soc*, 124, 10157 (2002), which is incorporated by reference in its entirety), and a pattern similar to previously reported sol-gel based sodium vanadium oxide materials (Lee, 2011). The observed XRD pattern was similar to previously indexed vanadium oxide ($Na_0.3V_2O_5.1.5\ H_2O$) prepared via ion exchange of a $V_2O_5$ xerogel (Durupthy, 2005). Based on this report, the observed pattern could be indexed with the major peaks at positions of 7°, 25°, and 50° two theta corresponding to the 001, 310, 020 reflections, respectively. The 2-Θ position of the 001 peak was used to calculate an interlayer spacing of 12.3 Å.

Previous findings on sodium-based vanadium oxides generated by a sol-gel method noted significant influence of the water content on the interlayer spacing which ranged from 11.1 Å to 11.9 Å at ambient temperature with water content (n) ranging from 0.75 to 1.38 (Lee, 2011). The level of hydration of the magnesium vanadium oxide was determined using thermogravimetric analysis (TGA), which showed the material to have 1.8 (ranging from 1.0 to 3.0) equivalents of water per formula unit at room (ambient) temperature (20° C. to 25° C.). The somewhat larger interlayer spacing observed with the magnesium vanadium oxide material is consistent with a higher water content as one interfoliar water layer has been reported to contribute a thickness of 2.8-3.0 Å (O. Pelletier, et al., "The effect of attractive interactions on the nematic order of $V_2O_5$ gels," *Europhysics Letters*, 48, 53 (1999) and P. Aldebert, et al., "Vanadium pentoxide gels: III. X-ray and neutron diffraction study of highly concentrated systems: One-dimensional swelling," *J. Colloid Interface Sci.*, 98, 478 (1984), each of which is incorporated by reference in its entirety).

Figure 6A:
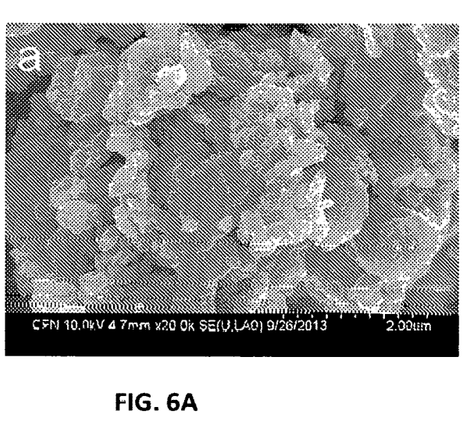
FIGS. 6A and 6B are scanning electron micrographs of $Mg_{0.1}V_2O_5$ at magnifications of 20,000× and 1,000×, respectively.
Figure 6B:
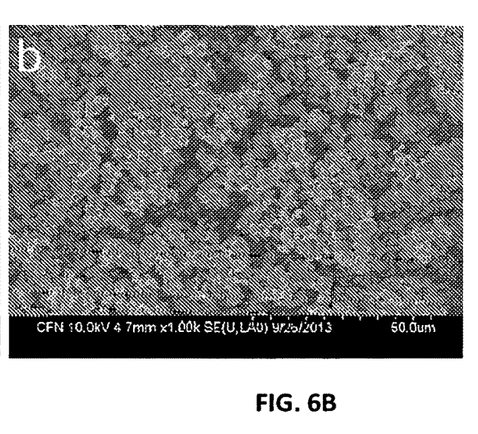

Differential scanning calorimetry (DSC) showed a broad exotherm between 360° C. and 400° C. that could be attributed to crystallization of the amorphous vanadium oxide to a more ordered phase (P. Aldebert, et al., "Layered structure of vanadium pentoxide gels," *Materials Research Bulletin*, 16, 669 (1981), which is incorporated by reference in its entirety). Although poorly crystalline, our as-prepared material was not fully amorphous. The Mg/V ratio in our product could be controlled via the synthetic approach and a range of compositions from 0.01 Mg/2 V to 1 Mg/2 V (Atom/Atom) was prepared and explored. A typical range of Mg used for this set of experiments was between 0.08 and 0.25 for each 2 V. For the experiments described here, the ratio was held at 0.1 Mg/2.0 V, as determined by inductively coupled plasma-optical emission spectroscopy (ICP-OES). Therefore, based on the ICP-OES and TGA data, a formula of $Mg_{0.1}V_2O_5.1.8H_2O$ was assigned. Scanning electron microscopy showed a granular morphology consisting of agglomerates of sub-micron sized particles (FIGS. 6A and 6B). The granular morphology was consistent with the low measured surface area of 4 $m^2/g$. The surface area range was typically 2 $m^2/g$ to 6 $m^2/g$.

Electrochemical Evaluation

Figure 7A:
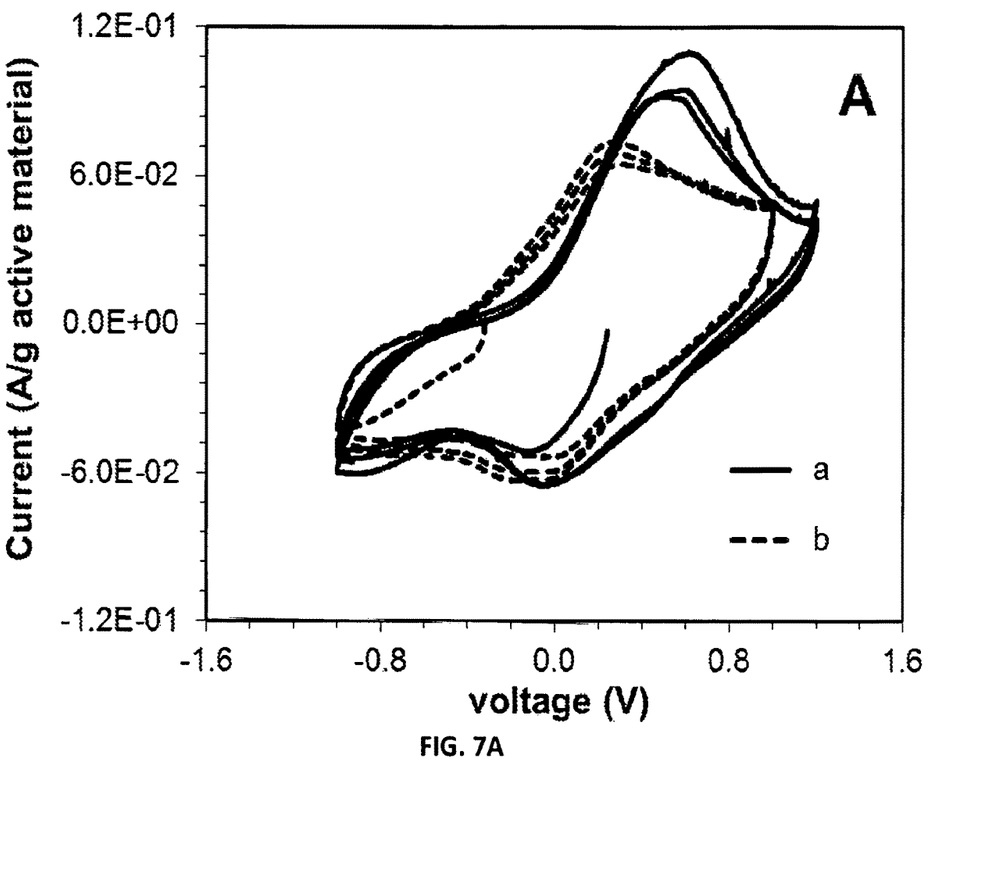
FIGS. 7A and 7B are cyclic voltammograms obtained by slow scan voltammetry at $10^{-4}$ Volts/s in which the working electrode is $Mg_{0.1}V_2O_5$, the reference electrode is $Ag/Ag^+$, and the auxiliary electrode is Pt. The results shown in FIG. 7A were obtained using an electrolyte containing 0.1M $Mg(ClO_4)_2$ in $CH_3CN$, while those in FIG. 7B were obtained using an electrolyte containing 0.1M $Mg(TFSI)_2$ in EC:DMC (30:70).
Figure 7B:
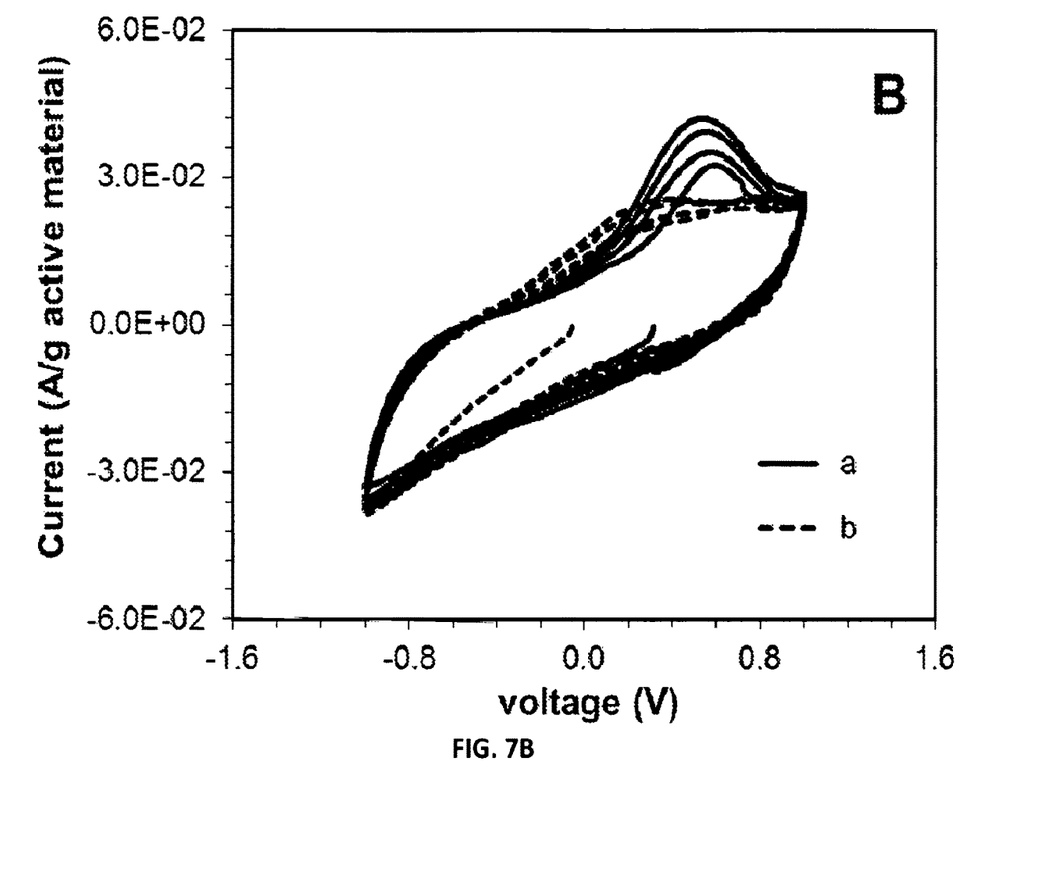

The electrochemistry of the $Mg_{0.1}V_2O_5.1.8H_2O$ material was initially assessed by slow scan rate voltammetry, using $Ag/Ag^+$ as reference (FIGS. 7A and 7B). Two solvent systems (acetonitrile ($CH_3CN$) or ethylene carbonate:dimethyl carbonate (EC:DMC)) and two electrolyte salts (magnesium perchlorate ($Mg(ClO_4)_2$) or magnesium bis(trifluoromethylsulfonylimide) ($Mg(TFSI)_2$)) were evaluated. In $CH_3CN$, a cathodic peak is noted at ~0.0 Volts with an anodic peak at ~0.5 Volts for the $Mg(ClO_4)_2$ electrolyte (FIG. 7A).

In $CH_3CN$, a cathodic peak is noted at ~0.0 Volts with an anodic peak at ~0.2 Volts for the $Mg(TFSI)_2$ electrolyte. While the TFSI based-electrolyte shows slightly improved reversibility, the perchlorate based-electrolyte showed evidence of increased current per gram of active material. In EC:DMC, a cathodic peak is noted at ~0.5 Volts for the $Mg(ClO_4)_2$ electrolyte, with a much smaller cathodic peak at ~0.0 Volts for the $Mg(TFSI)_2$ electrolyte (FIG. 7B). In the EC:DMC based solvent system, the system does not show an anodic peak in either electrolyte. In all cases, the peak positions and the current per gram do not change substantially from cycles 2 to 3. The peak potentials measured through the experiments could shift by ±100 mV.

Recent theoretical analysis of the de-solvation energy for $Mg^{2+}$ ions in organic solvents provides a basis for understanding the experimental observations of significantly improved current per gram of active material for the $CH_3CN$-based electrolyte relative to the EC:DMC electrolyte (M. Okoshi, et al., "Theoretical Analysis on De-Solvation of Lithium, Sodium, and Magnesium Cations to Organic Electrolyte Solvents," *J. Electrochem. Soc.*, 160, A2160 (2013), which is incorporated by reference in its entirety). The de-solvation energy of $Mg^{2+}$ in $CH_3CN$ was calculated to be 490.8 kJ/mol, while that of EC is reported as 552.9 kJ/mol. While DMC was not reported, diethyl carbonate (DEC) was reported to be 623.0 kJ/mol. Thus, based on the prior theoretical analysis, the kinetics of $Mg^{2+}$ ion insertion would be more favorable in $CH_3CN$ relative to the carbonate-based solvents, consistent with the experimental observations.

Figure 8A:
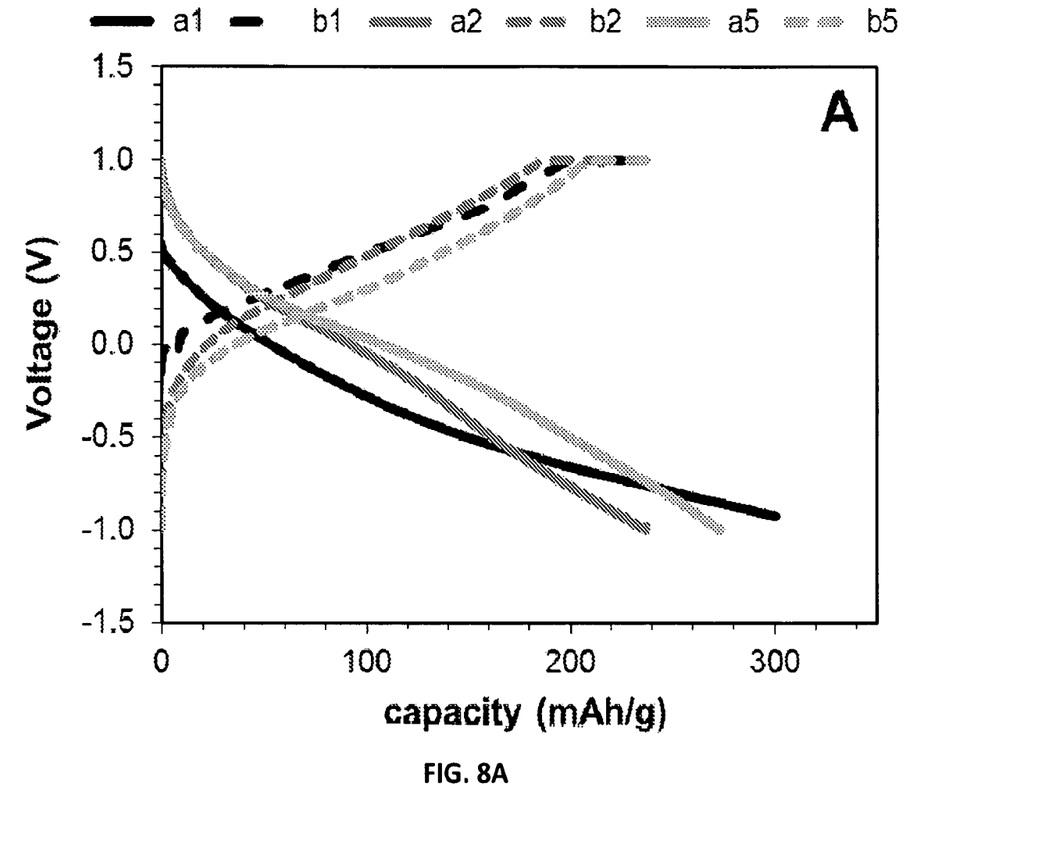
Figure 8B:
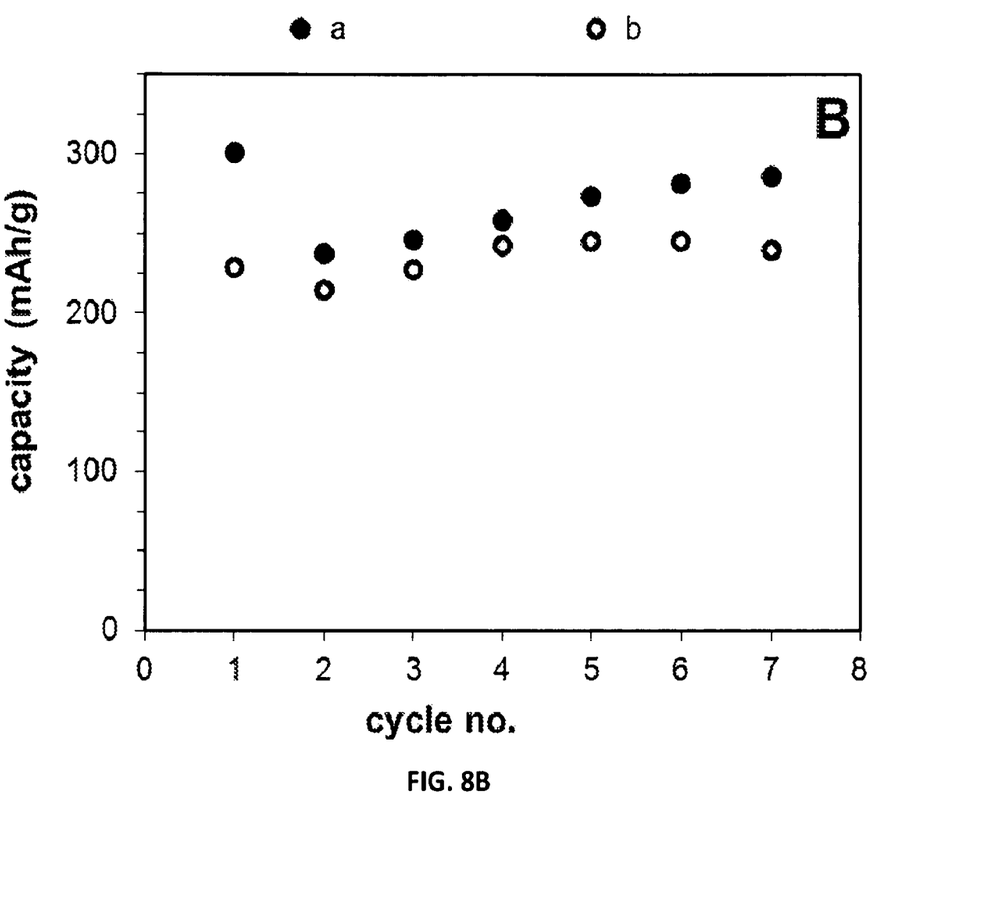

Discharge-charge type cycle tests were conducted under galvanostatic control at a C/10 rate to assess behavior in secondary batteries, using the $CH_3CN$-based electrolyte (FIGS. 8A and 8B). A sloping voltage profile was noted with small evidence of a voltage plateau near 0.0 Volts versus $Ag/Ag^+$. The first discharge delivered 300 mAh/g, while the second discharge delivered 230 mAh/g indicating capacity loss between the first and second cycles. As cycling continued, there was a small increase in delivered capacity noted where the delivered capacity was 280 mAh/g at cycle 7, consistent with exchange of approximately one $Mg^{2+}$ ion (two electron equivalents) per formula unit. Although the range of $Mg^{2+}$ insertion was rate dependent, under similar conditions a typical range was 0.8 to 1.0.

An increase in discharge capacity with successive cycling has been previously reported for $Mg^{2+}$ insertion into $V_2O_5$, attributed to a gradual wetting of electrode with electrolyte or an increase of electronic conductivity of the electrode (Imamura, *J. Electrochem. Soc.*, 2003). Notably, this capacity was achieved with conventional electrode fabrication and processing, demonstrating that continuous cycling of the sol-gel prepared $Mg_{0.1}V_2O_5.1.8H_2O$ material is feasible.

Alternative electrode fabrication methods resulting in electrodes with higher porosity may further facilitate the ion insertion and extraction.

Figure 9:
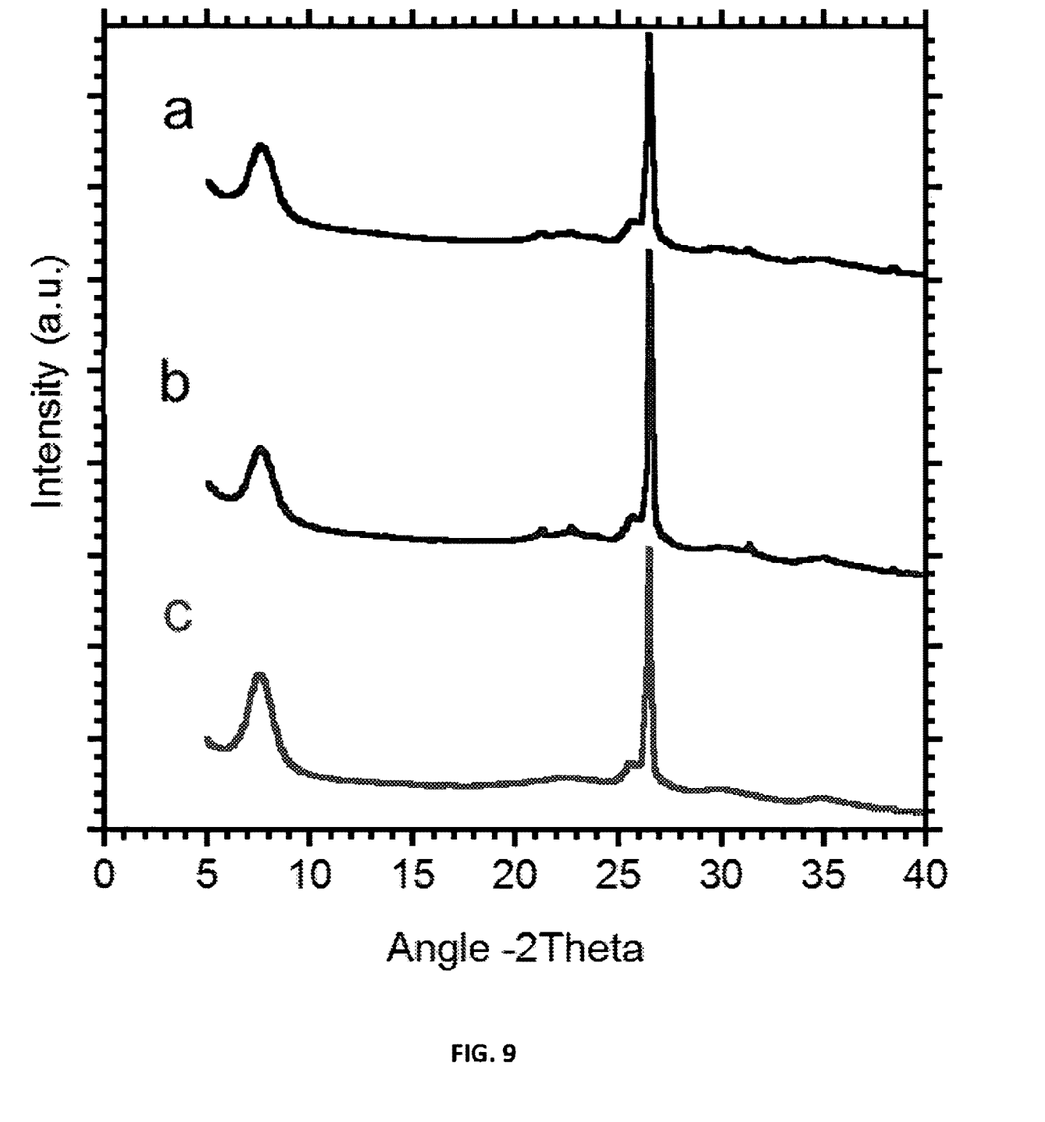
FIG. 9 is a composite of three XRD patterns, offset vertically for clarity, showing the patterns for electrodes in the a) discharged, b) charged, and c) as-prepared states.

As noted above, an interlayer spacing of 12.3 Å was determined for the as-synthesized $Mg_{0.1}V_2O_5 \cdot 1.8H_2O$ material. XRD scans were recorded for the magnesium vanadium oxide electrodes as prepared, after discharge, and after charge. (See FIG. 9, in which the observed narrow peak at 26° 2 Θ is due to graphite.) The material does have some crystalline nature, as it can be characterized by XRD. Nevertheless, the crystallinity is so low that detailed structural analysis from the diffraction pattern is not possible. However, no change in the (001) peak position at ~7° 2 Θ was noted, indicating no change in the interlayer spacing of the vanadium-oxygen layers.

This is in contrast to previous reports on insertion of $Mg^{2+}$ into $V_2O_5$, where a change from ~14.1 Å for $V_2O_5$ to ~12.3 Å for $Mg_{1}0.0V_2O_5$ was reported on discharge, and on charge the spacing increased to ~13.7 Å for $Mg_{0.1}V_2O_5$ (D. Imamura and M. Miyayama, "Characterization of magnesium-intercalated $V_2O_5$/carbon composites," *Solid State Ionics*, 161, 173 (2003), which is incorporated by reference in its entirety). This observation can be understood due to the differences in the two materials. As the water content was not identified in the prior report, it is possible that differences in the water content could also contribute to the differences in the interlayer spacing.

Further, in this disclosure, $Mg^{2+}$ was present during formation of the vanadium oxide layers, resulting in reduced interlayer repulsion of the oxide layers and a smaller interlayer spacing for the as-synthesized $Mg_{0.1}V_2O_5 \cdot 1.8H_2O$ material relative to the previously reported $V_2O_5$ material. Consistent d-spacing upon $Mg^2$ insertion and removal from the cathode active material should promote improved stability over multiple long-term discharge-charge cycling. In these experiments good capacity was retained after 10 discharge-charge cycles. Notably, the d-spacing of sol-gel based layered vanadium oxide materials is directly related to water content where the d-spacing decreases as the water level in the interlayer spacing decreases (Lee, 2011). One interfoliar water layer has been associated with 2.8-3.0 Å thickness (Aldebert, 1984 and Aldebert, 1981). Thus, the observation of no change in d-spacing for the $Mg_{0.1}V_2O_5 \cdot 1.8H_2O$ indicates that the interlayer water remained within the structure during the discharge and charge processes.

While the above is a description of what are presently believed to be the preferred embodiments of the invention, various alternatives, modifications, and equivalents may be used. Those skilled in the art will realize that other and farther embodiments can be made without departing from the spirit of the invention, and it is intended to include all such further modifications and changes as come within the true scope of the following claims. Therefore, the above description should not be taken as limiting the scope of the invention, which is defined solely by the claims.

We claim:

1. A method of making a Mg-deficient metal oxide composition comprising $Mg_zM_xO_y$, wherein M is a metal selected from the group consisting of V, Mn, and Fe; z/(x+y+z) is the mole fraction of Mg in the composition; x/(x+y+z) is the mole fraction of metal M in the composition; and y/(x+y+z) is the mole fraction of O in the composition, each of x and y and z being greater than zero, the method comprising:
    a direct, low-temperature, sol-gel synthesis process, the process including:
    isolating a precursor comprising a stoichiometric Mg-containing metal oxide as a crystalline material;
    dissolving the precursor in water at a dissolution temperature between 20° C. and 60° C.; and
    treating the dissolved precursor at said dissolution temperature by ion exchange to obtain the Mg-deficient metal oxide sol composition comprising $Mg_zM_xO_y$.

2. The method of claim 1, wherein the direct, low-temperature, sol-gel synthesis process occurs at ambient temperature comprising no intermediates between the dissolved precursor and the Mg-deficient metal oxide sol composition.

3. The method of claim 2, wherein the direct, low-temperature, sol-gel synthesis based process proceeds from the dissolved precursor to the Mg-deficient metal oxide sol composition without further processing other than the steps of isolating, dissolving and treating.

4. The method of claim 2, wherein the dissolving the precursor in water comprises adding the precursor to water at said dissolution temperature while stirring.

5. The method of claim 1, wherein the treating the dissolved precursor comprises:
    passing the dissolved precursor through an ion-exchange column; and
    recovering a Mg-deficient metal oxide sol composition comprising $Mg_zM_xO_y$.

6. The method of claim 1, wherein the treating the dissolved precursor comprises:
    adding an ion-exchange resin to the dissolved precursor;
    swirling a resulting mixture gently;
    filtering the mixture; and
    recovering a Mg-deficient metal oxide sol composition comprising $Mg_zM_xO_y$.

7. The method of claim 1, further comprising:
    directly incorporating a divalent cation into the composition during a gel formation step.

8. The method of claim 7, wherein the Mg-deficient metal oxide composition is $Mg_zV_2O_5$ and the divalent cation is $Mg^{2+}$.

9. The method of claim 2, wherein the ambient temperature is between 20° C. and 25° C.

* * * * *